(12) United States Patent
Wong

(10) Patent No.: US 10,386,560 B2
(45) Date of Patent: Aug. 20, 2019

(54) WAVELENGTH CONVERSION LIGHT GUIDE ASSEMBLY AND LIGHT SOURCE MODULE

(71) Applicant: ChengFeng Optronics Corporation, Taichung (TW)

(72) Inventor: Ching-Fang Wong, Taichung (TW)

(73) Assignee: ChengFeng Optronics Corporation, Taichung (TW)

( * ) Notice: Subject to any disclaimer, the term of this patent is extended or adjusted under 35 U.S.C. 154(b) by 0 days.

(21) Appl. No.: 15/916,150

(22) Filed: Mar. 8, 2018

(65) Prior Publication Data

US 2018/0267225 A1    Sep. 20, 2018

Related U.S. Application Data

(60) Provisional application No. 62/469,536, filed on Mar. 10, 2017.

(30) Foreign Application Priority Data

Jan. 26, 2018    (TW) .............................. 107102823 A

(51) Int. Cl.
 *F21V 21/00* (2006.01)
 *F21V 8/00* (2006.01)

(52) U.S. Cl.
 CPC ........... *G02B 6/0023* (2013.01); *G02B 6/003* (2013.01); *G02B 6/0025* (2013.01); *G02B 6/0036* (2013.01); *G02B 6/0065* (2013.01); *G02B 6/0088* (2013.01); *G02B 6/0051* (2013.01); *G02B 6/0053* (2013.01); *G02B 6/0055* (2013.01)

(58) Field of Classification Search
 CPC .................................................. G02B 6/0023

USPC .......................................... 362/608, 621, 622
See application file for complete search history.

(56) References Cited

U.S. PATENT DOCUMENTS

| 2013/0271700 | A1* | 10/2013 | Nakamura | G02B 6/0026 349/65 |
| 2014/0036532 | A1* | 2/2014 | Lee | G02B 6/0021 362/608 |
| 2015/0226904 | A1* | 8/2015 | Bae | G02B 6/0023 362/608 |
| 2015/0234111 | A1* | 8/2015 | Lee | G02B 6/0023 362/608 |

(Continued)

FOREIGN PATENT DOCUMENTS

| CN | 102628580 | 8/2012 |
| TW | 200848809 | 12/2008 |

OTHER PUBLICATIONS

Translation of CN102628580; Espacenet; Oct. 27, 2018.*
Office Action of Taiwan Counterpart Application, dated Jul. 17, 2018, pp. 1-6.

*Primary Examiner* — Laura K Tso
(74) *Attorney, Agent, or Firm* — JCIPRNET

(57) ABSTRACT

A wavelength conversion light guide assembly including a light guide plate, a holding element, and a wavelength conversion material is provided. The holding element is jointed with at least one side of the light guide plate, wherein the holding element and the light guide plate enclose a closed accommodating space. The wavelength conversion material is disposed in the accommodating space and includes a plurality of quantum dots. A light source module using the wavelength conversion light guide assembly is also provided.

16 Claims, 9 Drawing Sheets

(56) References Cited

U.S. PATENT DOCUMENTS

| | | | | |
|---|---|---|---|---|
| 2015/0260906 A1* | 9/2015 | Li | ............... | G02B 6/0088 |
| | | | | 362/608 |
| 2015/0293292 A1* | 10/2015 | Lee | ............... | G02B 6/0026 |
| | | | | 362/608 |
| 2015/0355400 A1* | 12/2015 | Li | ............... | G02F 1/133608 |
| | | | | 349/62 |
| 2016/0091657 A1* | 3/2016 | Yang | ............... | G02F 1/133615 |
| | | | | 362/608 |
| 2016/0161659 A1* | 6/2016 | Minami | ............... | G02B 6/0031 |
| | | | | 362/609 |
| 2016/0187563 A1* | 6/2016 | Lee | ............... | G02B 6/0091 |
| | | | | 362/608 |

* cited by examiner

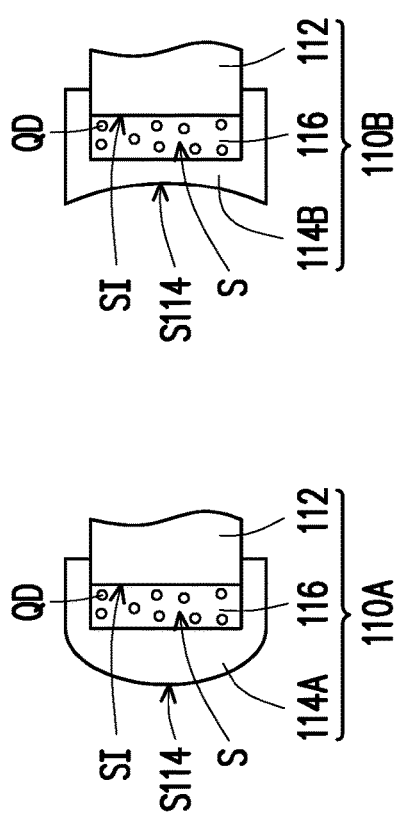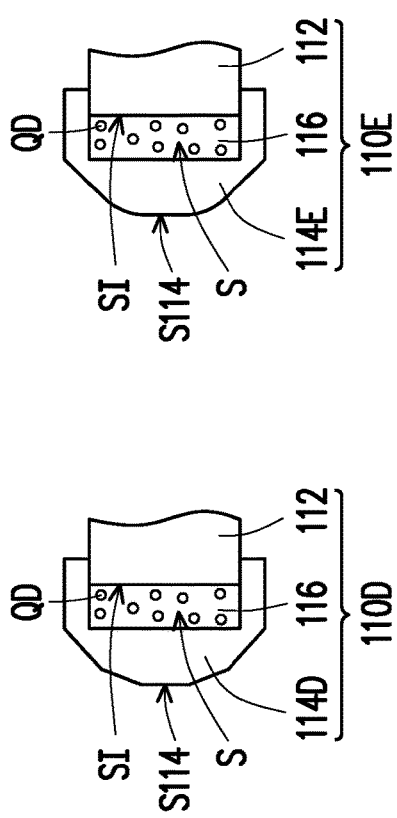

WAVELENGTH CONVERSION LIGHT GUIDE ASSEMBLY AND LIGHT SOURCE MODULE

CROSS-REFERENCE TO RELATED APPLICATION

This application claims the priority benefits of U.S. provisional application Ser. No. 62/469,536, filed on Mar. 10, 2017, and Taiwan application serial no. 107102823, filed on Jan. 26, 2018. The entirety of each of the above-mentioned patent applications is hereby incorporated by reference herein and made a part of this specification.

BACKGROUND OF THE INVENTION

Field of the Invention

The invention is related to a light guide assembly and an optical module using the light guide assembly, and particularly to a wavelength conversion light guide assembly and a light source module.

Description of Related Art

With excellent properties such as high light-emitting efficiency and high color saturation, quantum dot materials have been commonly used in various electronic devices in recent years. Take a backlight module of a display device as an example, there has been technology developed to mix quantum dot materials into the package material of the light emitting diode chip to convert the light beam emitted by the light emitting diode chip into required light color for display. However, such approach can easily reduce light-emitting efficiency. On the other hand, another technology has been proposed to manufacture the quantum dot material into an optical film, and the optical film is disposed in the backlight module to provide the required light color for display. However, the optical film formed of the quantum dot material can easily get moisturized, and thus the light-emitting efficiency of the backlight module is affected.

SUMMARY OF THE INVENTION

The invention provides a wavelength conversion light guide assembly which facilitates to reduce effect of moisture.

The invention provides a light source module which has good light-emitting efficiency.

The invention provides a wavelength conversion light guide assembly which includes a light guide plate, a holding element and a wavelength conversion material. The holding element is jointed with at least one side of the light guide plate, wherein the holding element and the light guide plate enclose a closed accommodating space. The wavelength conversion material is disposed in the accommodating space and includes a plurality of quantum dots.

The invention provides a light source module which includes a light source and the wavelength conversion light guide assembly. The light source is disposed on one side of the wavelength conversion light guide assembly, wherein the holding element is disposed between the wavelength conversion material and the light source.

According to an embodiment of the wavelength conversion light guide assembly and the light source module of the invention, the wavelength conversion light guide assembly further includes an adhesive layer, wherein the holding element and the light guide plate are jointed together through the adhesive layer.

According to an embodiment of the wavelength conversion light guide assembly and the light source module of the invention, a refractive index of the adhesive layer is smaller than or equal to a refractive index of the light guide plate.

According to an embodiment of the wavelength conversion light guide assembly and the light source module of the invention, the wavelength conversion material further includes a plurality of scattering particles.

According to an embodiment of the wavelength conversion light guide assembly and the light source module of the invention, the wavelength conversion light guide assembly further include a barrier layer. The barrier layer is disposed on a surface of the wavelength conversion material.

According to an embodiment of the wavelength conversion light guide assembly and the light source module of the invention, the barrier layer includes metal thin films, silicon-oxide thin films, silicon-nitride thin films, aluminum-oxide thin films or nylon nanocomposites.

According to an embodiment of the wavelength conversion light guide assembly and the light source module of the invention, a surface of the holding element away from the light guide plate includes a plurality of micro-structures.

According to an embodiment of the wavelength conversion light guide assembly and the light source module of the invention, the holding element includes a first portion and at least one second portion. The first portion is jointed with the light guide plate, wherein at least one opening is formed between the first portion and the light guide plate. The at least one opening communicates an accommodating space with an external space. The wavelength conversion material is disposed in the accommodating space through the at least one opening. The at least one second portion is disposed in the at least one opening to close the at least one opening, wherein the first portion, the at least one second portion and the light guide plate enclose the closed accommodating space.

According to an embodiment of the wavelength conversion light guide assembly and the light source module of the invention, a material of the first portion and the at least one second portion includes glass, plastic or encapsulant.

In summary, according to the embodiments of the wavelength conversion light guide assembly and the light source module of the invention, since the wavelength conversion material is disposed in the closed accommodating space enclosed by the holding element and the light guide plate, the wavelength conversion light guide assembly facilitates to prevent the quantum dot from getting moisturized, and the light source module using the wavelength conversion light guide assembly can have good light-emitting efficiency.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A to FIG. 2J are schematic cross-sectional views illustrating enlargement of a portion of the wavelength conversion light guide assembly of the light source module in FIG. 1A realized in other forms.

DESCRIPTION OF EMBODIMENTS

Figure 1A:
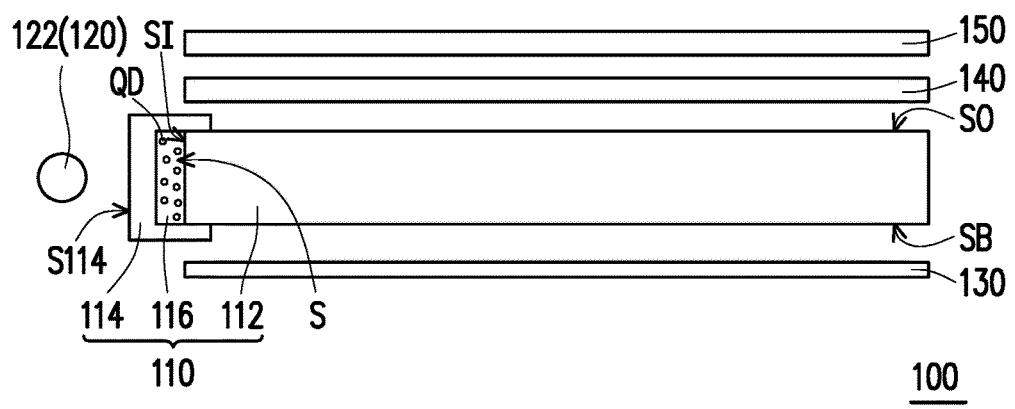
FIG. 1A is a schematic cross-sectional view illustrating a light source module according to an embodiment of the invention.
Figure 1B:
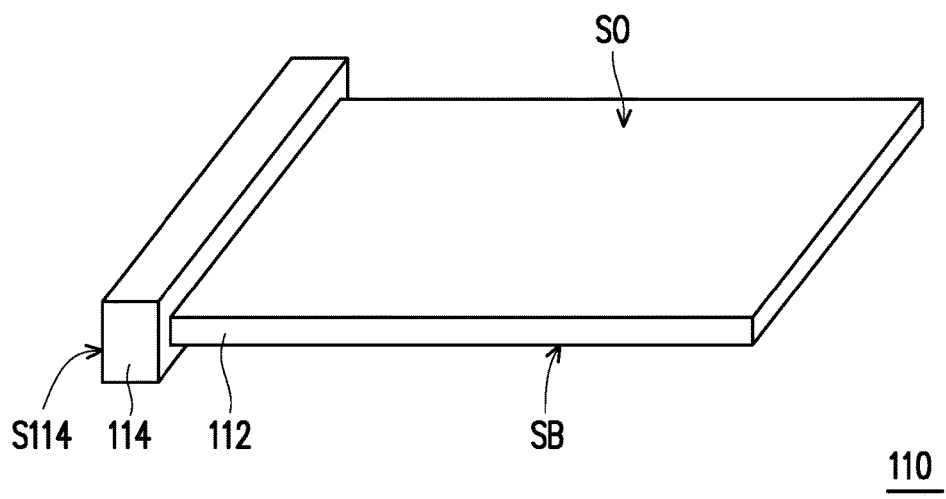
FIG. 1B is a schematic view illustrating a wavelength conversion light guide assembly of the light source module in FIG. 1A.

FIG. 1A is a schematic cross-sectional view illustrating a light source module according to an embodiment of the invention. FIG. 1B is a schematic view illustrating a wavelength conversion light guide assembly of the light source module in FIG. 1A. Referring to FIG. 1A and FIG. 1B, a light source module 100 in an embodiment of the invention includes a wavelength conversion light guide assembly 110 and a light source 120.

The wavelength conversion light guide assembly 110 includes a light guide plate 112, a holding element 114 and a wavelength conversion material 116. The light guide plate 112 has a light incident surface SI, a light output surface SO and a bottom surface SB. Take a side-incident type light source module as an example, the light incident surface SI is a lateral surface of the light guide plate 112, the light output surface SO is opposite to the bottom surface SB (i.e., the light output surface SO is the top surface of the light guide plate 112), and the light incident surface SI is connected between the light emitting surface SO and the bottom surface SB.

The light guide plate 112 adopts a transparent material to reduce loss of light beam in the light guide plate 112. Herein, the transparent material refers to a material with high transmittance and is not limited to the material which has 100% of transmittance. For example, the material of the light guide plate 112 may include glass or plastic, which should not be construed as a limitation to the invention. The plastic may be polycarbonate (PC) or polymethyl methacrylate (PMMA), which should not be construed as a limitation to the invention. Since the refractive index of the light guide plate 112 is larger than the refractive index of air, the light beam that enters the light guide plate 112 can be effectively transmitted toward a direction away from the light incident surface SI through total internal reflection (TIR), thereby forming a plane light source required for illumination.

Depending on different needs, the light output surface SO, the bottom surface SB or both of the light output surface SO and the bottom surface SB of the light guide plate 112 may be provided with a plurality of micro-structures such as V-shape trenches or mesh points, which should not be construed as a limitation to the invention. For example, the bottom surface SB of the light guide plate 112 may be provided with a plurality of mesh points (not shown) to destroy total internal reflection such that the light beam entering the light guide plate 112 is emitted out of the light guide plate 112 from the light emitting surface SO.

In the embodiment, the bottom surface SB and the light output surface SO are parallel with each other, which should not be construed as a limitation to the invention. In another embodiment, when the light guide plate 112 is a wedge light guide plate, the bottom surface SB is inclined relative to the light output surface SO.

The holding element 114 is jointed with at least one side of the light guide plate 112. In the embodiment, the wavelength conversion light guide assembly 110 only includes one holding element 114, and the holding element 114 is jointed with only one side of the light guide plate 112. However, the number of the holding element 114 and the relative configuration relation between the holding element 114 and the light guide plate 112 are not limited thereto. For example, the holding element 114 may be jointed with a plurality of adjacent sides of the light guide plate 112. Alternatively, the wavelength conversion light guide assembly 110 may include a plurality of holding elements 114, and the plurality of holding elements 114 are respectively jointed with a plurality sides of the light guide plates 112. Such improvements are applicable to the following embodiments, and thus no repetitions are incorporated hereinafter.

The holding element 114 and the light guide plate 112 enclose a closed accommodating space S to accommodate the wavelength conversion material 116. The wavelength conversion material 116 is disposed in the accommodating space S and includes a plurality of quantum dots QD. The holding element 114 and the light guide plate 112 may be permanently or temporarily (detachably) fixed together. For example, the holding element 114 and the light guide plate 112 may be directly locked, engaged or fixed together through an additional element or a film layer. For example, the wavelength conversion light guide assembly 110 may further include an adhesive layer (not shown) or a mechanical element (not shown), wherein the holding element 114 and the light guide plate 112 are jointed together through the adhesive layer (or mechanical element). Take the adhesive layer as an example, the adhesive layer may only be disposed in a contact area of the holding element 114 and the light guide plate 112 such that the wavelength conversion material 116 and the light guide plate 112 are directly in contact with each other. Alternatively, the adhesive layer may be disposed in the contact area of the holding element 114 and the light guide plate 112 as well as a contact area of the wavelength conversion material 116 and the light guide plate 112. Additionally, the refractive index of the adhesive layer may be smaller than or equal to the refractive index of the light guide plate 112 to increase the efficiency of the light beam entering the light guide plate 112.

A plurality of quantum dots QD in the wavelength conversion material 116 are adapted to absorb short-wavelength light beam and excites long-wavelength light beam. For example, the plurality of quantum dots QD may include a plurality of quantum dots that convert blue light into green light, a plurality of quantum dots that convert blue light into red light, a plurality of quantum dots that convert blue light into green light and red light or a plurality of quantum dots that convert UV light into blue light, green light and red light.

The wavelength conversion material 116 may be formed by curing a liquid-state or gel-state material. For example, the liquid-state or gel-state material may be disposed in the holdings element 114 first and then undergo a curing step to form the wavelength conversion material 116. After the wavelength conversion material 116 is formed, the holding element 114 with the wavelength conversion material 116 may be jointed with the light guide plate 112. Alternatively, after the liquid-state or gel-state material is disposed in the holding element 114, a pre-curing step may be performed first. After the holding element 114 is jointed with the light guide plate 112, the curing step is performed subsequently. Or, the pre-curing step may be omitted, and after the holding element 114 is jointed with the light guide plate 112, the liquid-state or gel-state material disposed in the holding element 114 is cured subsequently.

The light source 120 is disposed on one side of the wavelength conversion light guide assembly 110, wherein the holding element 114 is disposed between the wavelength conversion material 116 and the light source 120. In order to avoid that the holding element 114 blocks the light beam from the light source 120, the holding element 114 adopts a transparent material. Herein, the transparent material refers to a material with high transmittance and is not limited to the material with 100% of transmittance. For example, the material of the holding element 114 may include glass or plastic, which should not be construed as a limitation to the invention. The plastic may be polycarbonate (PC) or polymethyl methacrylate (PMMA), which should not be construed as a limitation to the invention.

The light source 120 may include one or more light emitting elements 112 and a circuit board (not shown) configured to drive of the one or more light emitting elements 122. The light beam provided by the light emitting element 122 includes a short-wavelength light beam to excite the plurality of quantum dots in the wavelength conversion material 116. For example, the light emitting element 112 may include at least one of a blue light emitting diode and an UV light emitting diode.

The light beam emitted by the light source 120 passes through the transparent holdings element 114 and is subsequently irradiated on the wavelength conversion material 116 disposed between the holding element 114 and the light guide plate 112. The plurality of quantum dots QD in the wavelength conversion material 116 absorb the short-wavelength light beam emitted by the light source 120 and excites a long-wavelength light beam. The light beam that penetrates through the wavelength conversion material 116 enters the light guide plate 112 through the light incident surface SI of the light guide plate 112, and is transmitted between the light output surface SO and the bottom surface SB toward a direction away from the light incident surface SI through total internal reflection. In the process that the light beam is transmitted toward the direction away from the light incident surface SI, the light beam is partially incident into a micro-structure (not shown) on the bottom surface SB of the light guide plate 112; as a result, the transmitting path of the light beam is changed and the light beam is output from the light output surface SO.

Since the wavelength conversion material 116 is disposed in the closed accommodating space S enclosed by the holding element 114 and the light guide plate 112, it can be avoided that the quantum dots QD are exposed to the outer environment and get moisturized, such that the light source module 100 using the wavelength conversion light guide assembly 110 can have good light-emitting efficiency. Additionally, as compared with the approach of manufacturing the wavelength conversion material into an optical film or forming the entire wavelength conversion material on the light incident surface or bottom surface of the light guide plate, the embodiment disposes the wavelength conversion material 116 on the lateral side of the light guide plate 112 such that the amount of the wavelength conversion material 116 can be effectively saved.

In an embodiment, the wavelength conversion material 116 may further include a plurality of scattering particles (not shown) to increase the chance of exciting the quantum dots QD though scattering of light, thereby increasing color conversion efficiency. In another embodiment, the wavelength conversion light guide assembly 110 may further include a barrier layer (not shown) disposed on a surface of the wavelength conversion material 116 to further improve the moisture-proof effect. For example, the barrier layer may be disposed between the wavelength conversion material 116 and the holding element 114. Alternatively, the barrier layer may be disposed on any surface, a plurality of surfaces or every surface of the wavelength conversion material 116. The barrier layer may include a metal thin film, a silicon-oxide thin film, a silicon-nitride thin film, an aluminum-oxide thin film or nylon nanocomposites and so on, which should not be construed as a limitation to the invention. The metal thin film may be an aluminum film, which should not be construed as a limitation to the invention. Furthermore, the metal thin film, the silicon-oxide thin film, the silicon-nitride thin film or the aluminum-oxide thin film may be formed through evaporation method, which should not be construed as a limitation to the invention.

Depending on different needs, the light source module 100 may further include other elements or film layers. For example, the light source module 100 may further include a reflective sheet 130, a diffusion sheet 140 and a prism sheet 150. The reflective sheet 130 is disposed under the bottom surface SB of the light guide plate 112, such that the light beam emitted out of the light guide plate 112 from the bottom surface SB is reflected back to the light guide plate 112, thereby improving utilization of light. In an embodiment, the reflective sheet 130 may further be adhered to the bottom surface SB of the light guide plate 112 through an adhesive layer (not shown). The refractive index of the adhesive layer may be smaller than or equal to the refractive index of the light guide plate 112, which should not be construed as a limitation to the disclosure. The diffusion sheet 140 and the prism sheet 150 are sequentially stacked above the light output surface SO of the light guide plate 112 to achieve the effect of uniformness and improved brightness. It should be noted that the number and the configuration relation of the diffusion sheet 140 and the prism sheet 150 are not limited to the illustration shown in FIG. 1A. In an embodiment, the number of any one of the diffusion sheet 140 and the prism sheet 150 may be one or more. In addition, the relative configuration relation of the diffusion sheet 140 and the prism sheet 150 may be changed depending on the needs.

FIG. 2A to FIG. 2J are schematic cross-sectional views illustrating enlargement of a portion of the wavelength conversion light guide assembly of the light source module in FIG. 1A realized in other forms, wherein the same as or similar elements are denoted by the same as or similar reference numbers and no repetitions are incorporated hereinafter.

A wavelength conversion light guide assembly 110A in FIG. 2A to a wavelength conversion light guide assembly 110F in FIG. 2F are similar to the wavelength conversion light guide assembly 110 in FIG. 1A. The difference between the wavelength conversion light guide assemblies lies in the design of a surface S114 of the holding element 114 facing the light source 120. Specifically, in the wavelength conversion light guide assembly 110 in FIG. 1A, the surface S114 is a vertical plane perpendicular to the light output surface SO of the light guide plate 112. In the wavelength conversion light guide assembly 110A in FIG. 2A, the surface S114 is a curved surface (the curved surface convex toward the light source 120 in FIG. 1A) convex toward the direction away from the light guide plate 112. In the wavelength conversion light guide assembly 110B in FIG. 2B, the surface S114 is a curved surface concave toward the direction of the light guide plate 112. In the wavelength conversion light guide assembly 110C in FIG. 2C, the surface S114 includes a curved surface concave toward the direction of the light guide plate 112 and two curved surfaces located on two opposite sides of the concave curved surface and convex toward the direction away from the light guide plate 112. However, the number of the concave curved surface and the number of the convex curved surface may be changed depending on the needs and is not limited to the illustration shown in FIG. 2C. In the wavelength conversion light guide assembly 110D shown in FIG. 2D, the surface S114 is a multi-faceted surface convex toward the direction away from the light guide plate 112. The multi-faceted surface is, for example, constructed by a plurality of inclined planes inclined relative to the light incident surface SI of the light guide plate 112 and a vertical plane perpendicular to the light output surface SO (shown in FIG. 1A) of the light guide plate 112. In the wavelength conversion light guide assembly 110E shown in FIG. 2E, the surface S114 includes a curved surface convex toward the direction away from the light guide plate 112 and two inclined planes located on two opposite sides of the convex curved surface and inclined relative to the light incident surface SI of the light guide plate 112, wherein the two inclined planes are inclined in opposite directions. In the wavelength conversion light guide assembly 110F in FIG. 2F, the surface S114 includes a saw-toothed surface and a plurality of curved surfaces located on two opposite sides of the saw-toothed surface and convex toward the direction away from the light guide plate 112.

Figure 2G:
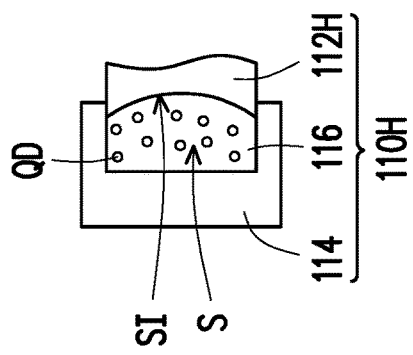
Figure 2H:
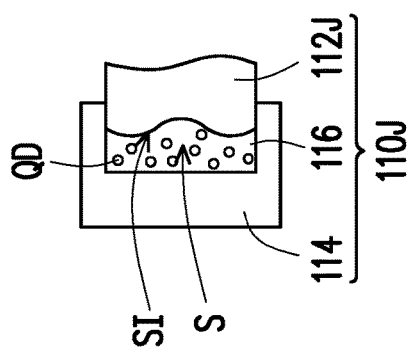
Figure 2I:
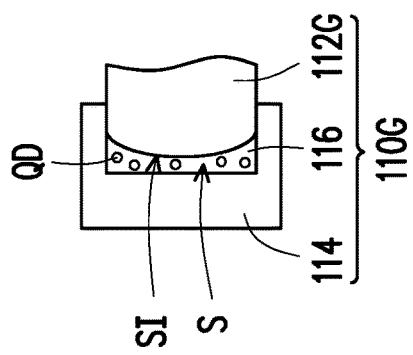
Figure 2J:
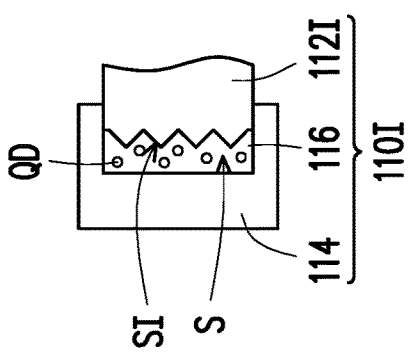

The wavelength conversion light guide assembly 110G in FIG. 2G to the wavelength conversion light guide assembly 110J in FIG. 2J are similar to the wavelength conversion light guide assembly 110 in FIG. 1A; the difference between them lies in the design of the light incident surface SI of the light guide plate 112. Specifically, in the wavelength conversion light guide assembly 110 shown in FIG. 1A, the light incident surface SI is perpendicular to the vertical plane of the light output surface SO of the light guide plate 112. In the wavelength conversion light guide assembly 110G shown in FIG. 2G, the light incident surface SI is a curved surface convex toward the holding element 114. In the wavelength conversion light guide assembly 110H shown in FIG. 2H, the light incident surface SI is a curved surface concave in the light guide plate 112. In the wavelength conversion light guide assembly 110I shown in FIG. 2I, the light incident surface SI is a saw-toothed surface. In the wavelength conversion light guide assembly 110J shown in FIG. 2J, the light incident surface SI includes a curved surface concave in the light guide plate 112 and two curved surfaces located on two opposite sides of the curved surface and convex toward the holding element 114. However, the number of the concave curved surface and the number of the convex curved surface may be changed depending on the need and not limited to the illustration shown in FIG. 2J.

In the embodiments shown in FIG. 2A to FIG. 2J, through the design of the surface S114 of the holding element 114 facing the light source 120 or the design of the light incident surface SI of the light guide plate 112, the efficiency of the light beam emitted by the light source 120 entering the holding element 114 and the wavelength conversion material 116 can be improved. In other embodiments, the design of the surface S114 and the design of the light incident surface SI of the light guide plate 112 may be combined depending on the need.

FIG. 3 to FIG. 8B are schematic views illustrating a light source module according to other embodiments of the invention. For ease of illustration, the light source module in FIG. 3 to FIG. 8B is illustrated with the omission of the reflective sheet 130, the diffusion sheet 140 and the prism sheet 150 in FIG. 1A. However, the light source module in FIG. 3 to FIG. 8B may include the above-mentioned elements or other elements depending on the needs and thus no repetitions are incorporated hereinafter.

Figure 3:
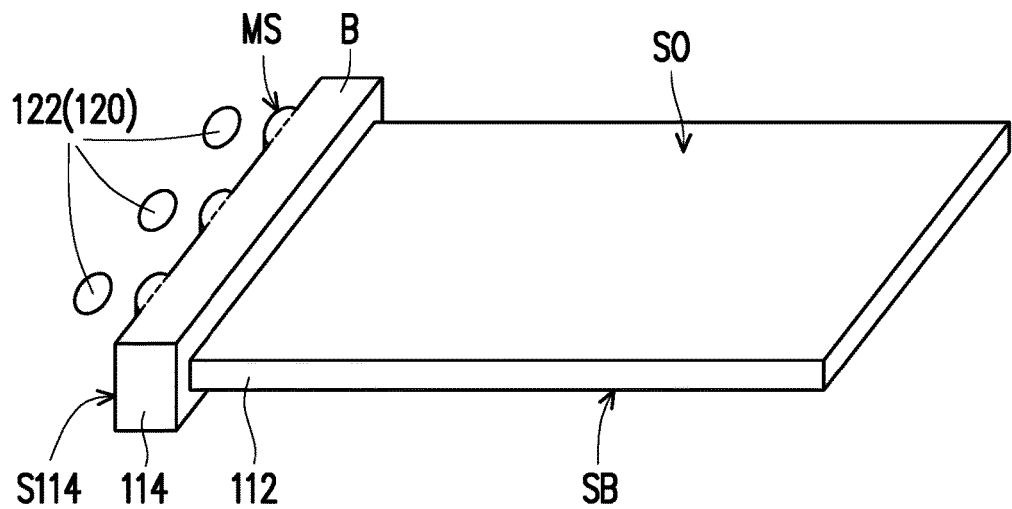
FIG. 3 to FIG. 8B are schematic views illustrating a light source module according to other embodiments of the invention.
Figure 4:
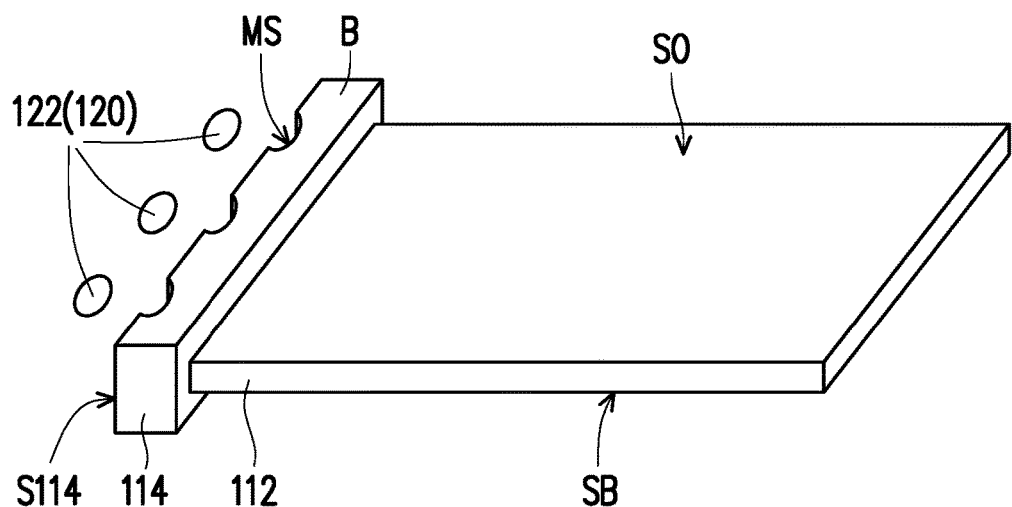
Figure 5:
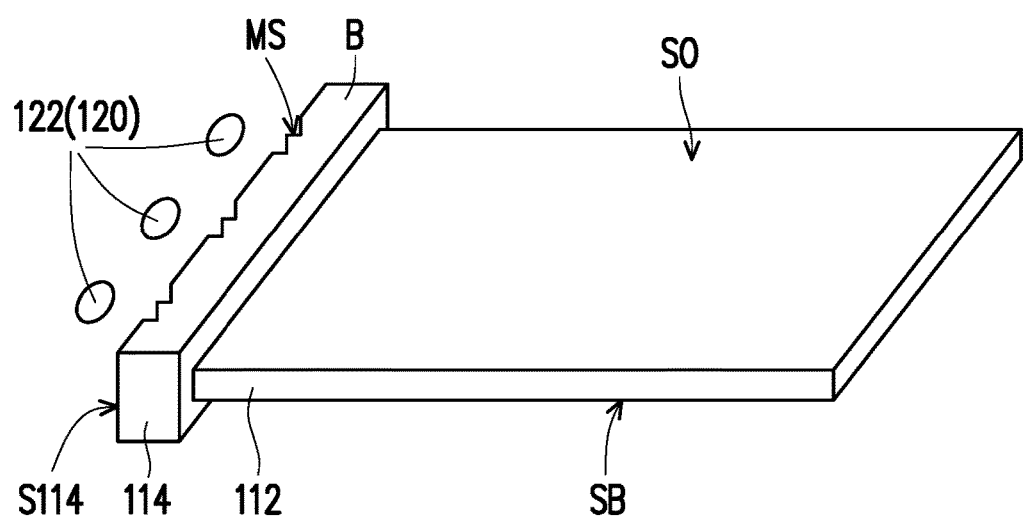

A light source module 200 in FIG. 3 to a light source module 400 in FIG. 5 are similar to the light source module 100 in FIG. 1A, but the light source module in FIG. 3 to FIG. 5 is illustrated at the viewing angle of FIG. 1B. The difference between the light source modules is the design of the surface of the holding element 114 away from the light guide plate 112 (i.e., the surface S114 of the light guide plate 112 facing the light source 120). Specifically, in the light source module 200 to the light source module 400, the surface S114 includes a plurality of micro-structures MS.

In the light source module 200 in FIG. 3, the micro-structures MS are a plurality of semi-cylinders convex toward the light source 120. The semi-cylinder refers to a portion of the cylinder but not limited to a half of the cylinder. The semi-cylinders are respectively extended toward a thickness direction of the light source module 200 and configured corresponding to the plurality of light emitting elements 122. However, the number, shape and size of the convex micro-structures MS and the relative configuration relation between the micro-structures MS and the light emitting elements 122 may be changed depending on the need and not limited to the illustration shown in FIG. 3. For example, the convex micro-structures MS may be a triangular pillar, which should not be construed as a limitation to the invention. Additionally, the convex micro-structures MS and a body B of the holding element 114 may be formed integrally. Alternatively, the convex micro-structures MS and the body B of the holding element 114 may be manufactured independently and jointed together through an adhesive layer or a mechanical element.

The light source module 300 in FIG. 4 is similar to the light source module 200 in FIG. 3. The difference between the two is that the micro-structures MS in FIG. 4 are a plurality of semi-cylindrical grooves concave toward the direction of the light guide plate 112. The semi-cylindrical grooves are respectively extended toward a thickness direction of the light source module 300 and configured corresponding to the plurality of light emitting elements 122. However, the number, shape, and size of the concave micro-structures MS and the relative configuration relation between the micro-structures MS and the light emitting elements 122 may be changed depending on the need and not limited to the illustration shown in FIG. 4.

The light source module 400 in FIG. 5 is similar to the light source module 300 in FIG. 4. The difference between the two is that the micro-structures MS in FIG. 5 are a plurality of triangular-pillar grooves concave toward the direction of the light guide plate 112. The triangular-pillar grooves are respectively extended toward a thickness direction of the light source module 400 and configured corresponding to the plurality of light emitting elements 122. However, the number, shape and size of the concave micro-structures MS and the relative configuration relation between the micro-structures MS and the light emitting elements 122 may be changed depending on the need and not limited to the illustration shown in FIG. 5.

In the embodiments shown in FIG. 3 to FIG. 5, with the design of the micro-structures MS, the efficiency of the light beam emitted by the light source 120 entering the holding element 114 and the wavelength conversion material 116 may be enhanced. In an embodiment, the design of the surface S114 of the holding element 114 facing the light source 120, the design of the light incident surface SI of the light guide plate 112 and the design of the micro-structures MS may be combined depending on the need. Additionally, the above-mentioned designs are applicable to the following embodiments; no repetitions are incorporated hereinafter.

The light source module in FIG. 6A to FIG. 8B are similar to the light source module 100 in FIG. 1A. The difference between the light source modules is the design of the holding element 114. Specifically, in FIG. 1A, the holding element 114 is a single element; in FIG. 6A to FIG. 8B, the holding element 114 is composed of a plurality of portions. In details, the holding element 114 includes a first portion P1 and at least one second portion P2. The first portion P1 is jointed with the light guide plate 112, wherein at least one opening O is formed between the first portion P1 and the light guide plate 112. The at least one opening O communicates the accommodating space S with the external space. The wavelength conversion material 116 is disposed in the accommodating space S through the at least one opening O. The at least one second portion P2 is disposed in the at least one opening O to close the at least one opening O, wherein the first portion P1, the at least one second portion P2 and the light guide plate 112 enclose the closed accommodating space S.

Figure 6A:
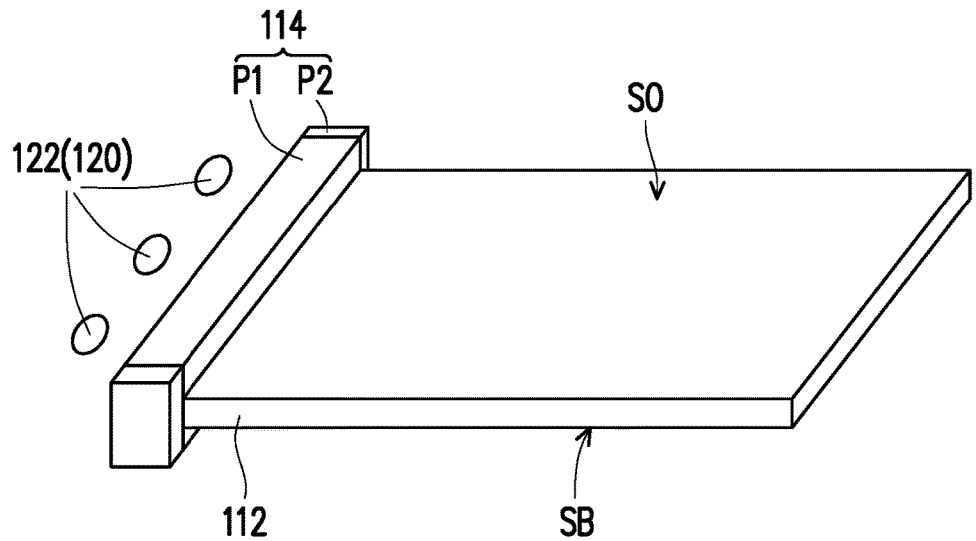
Figure 6B:
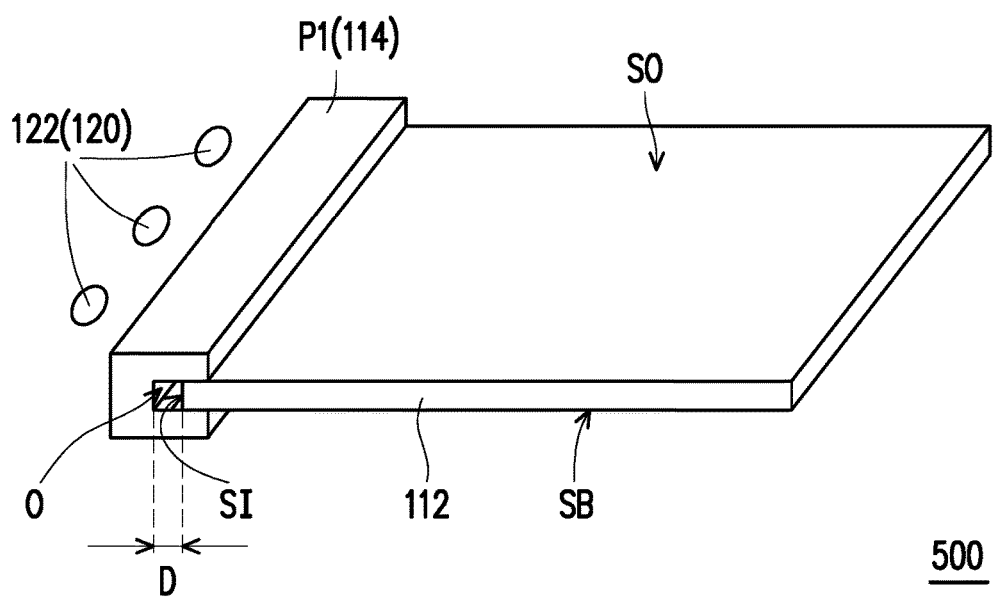

FIG. 6A shows a light source module 500 having the holding element 114 including one first portion P1 and two second portions P2. FIG. 6B does not illustrate the two second portions P2 of the holding element 114 and the wavelength conversion material 116 to clearly show the relative configuration relation between the first portion P1 and the light guide plate 112 and the opening O. Additionally, FIG. 6A and FIG. 6B illustrate the light source module 500 at the viewing angle in FIG. 1B.

Referring to FIG. 6A and FIG. 6B, the two second portions P2 are respectively located on two opposite sides of the first portion P1. Correspondingly, two openings O (FIG. 6B simply marks one opening O for exemplary purpose) are formed between the first portion P1 and the light guide plate 112, and the two openings O are respectively located on two opposite sides of the accommodating space (not marked). The first portion P1 is, for example, a strip having a striped trench. A portion of the light guide plate 112 adjacent to the light incident surface SI is inserted into the striped trench of the strip, and the light guide plate 112 is kept in a distance D from the bottom surface of the striped trench to form a space (i.e., the accommodating space) for accommodating the wavelength conversion material 116 and the two openings O for filling the wavelength conversion material 116. In the embodiment, the two openings O are respectively located on two opposite sides of the light incident surface SI of the light guide plate 112.

After the wavelength conversion material 116 is formed in the accommodating space, or the liquid-state or gel-state material for forming the wavelength conversion material 116 is filled in the accommodating space, the two second portions P2 and the first portion P1 may be jointed together to seal the wavelength conversion material 116 in the accommodating space enclosed by the first portion P1, the two second portions P2 and the light guide plate 112, thereby preventing the quantum dots QD in the wavelength conversion material 116 from getting moisturized.

The first portion P1 and the two second portions P2 may be directly locked, engaged or fixed together through an additional element or a film layer. With such configuration, the material of the first portion P1 and the two second portions P2 may include glass or plastic, which should not be construed as a limitation to the invention. Since the first portion P1 is located between the wavelength conversion material 116 and the light source 120, the first portion P1 adopts the transparent material to avoid blocking the light beam from the light source 120. On the other hand, since the two second portions P2 are not located between the wavelength conversion material 116 and the light source 120, that is, the two second portions P2 do not block the light beam from the light source 120, the material of the two second portions P2 is not limited to the transparent material. In other words, the material of the two second portions P2 may be the same as or different from the material of the first portion P1. In an embodiment, the material of the two second portions P2 may be encapsulant. With such configuration, after the wavelength conversion material 116 is formed in the accommodating space, or after the liquid-state or gel-state material for forming the wavelength conversion material 116 is filed into the accommodating space, the two openings O may be directly sealed through the encapsulant.

Figure 7A:
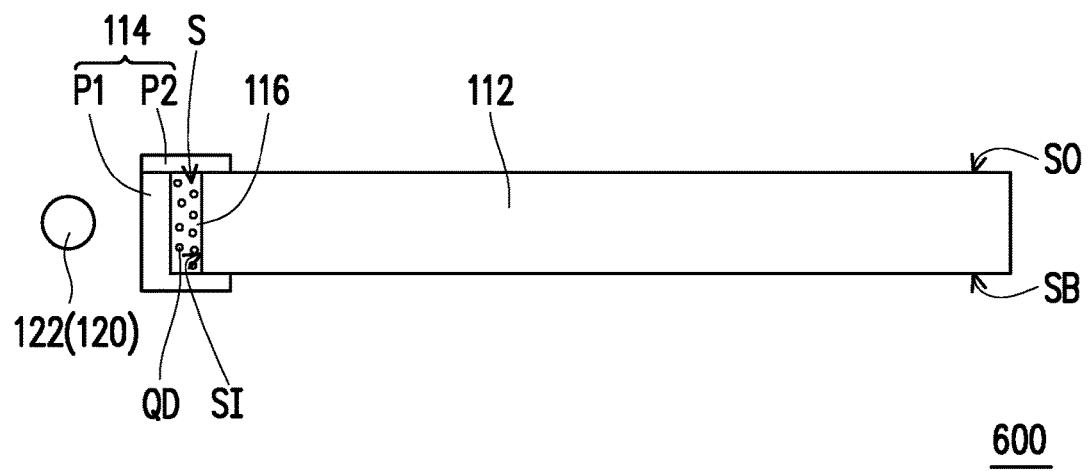
Figure 7B:
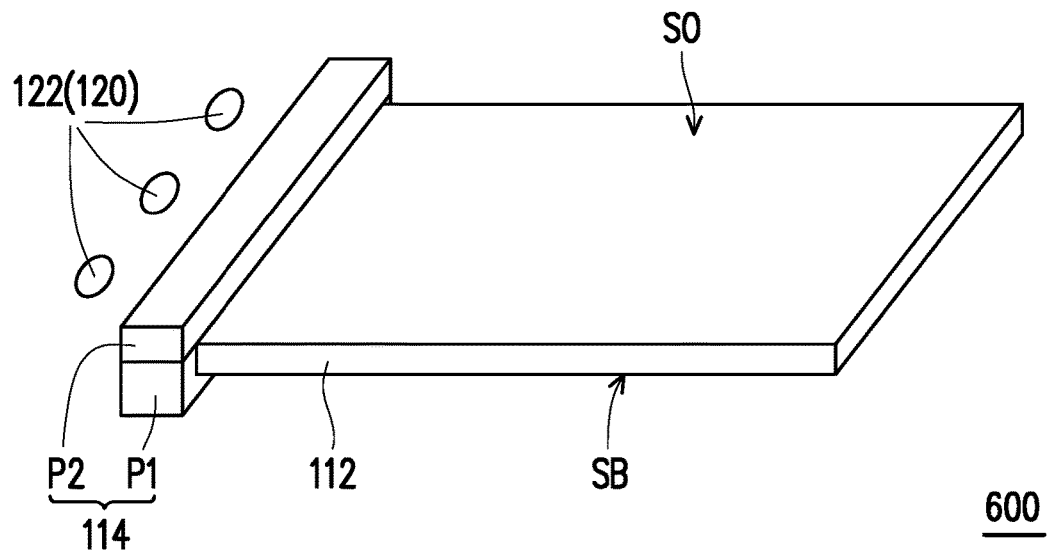
Figure 7C:
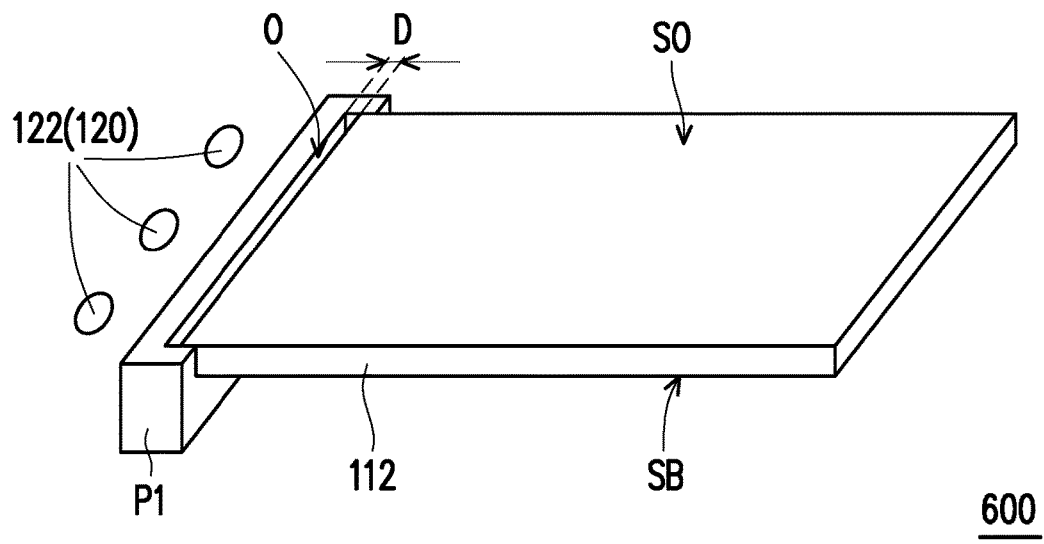

FIG. 7A and FIG. 7B illustrate a light source module 600 having the holding element 114 including a first portion P1 and a second portion P2. FIG. 7C does not illustrate the second portion P2 of the holding element 114 and the wavelength conversion material 116 to clearly show the relative configuration relation between the first portion P1 and the light guide plate 112 and the opening O. Additionally, FIG. 7A is a schematic cross-sectional view of the light source module 600, and FIG. 7B and FIG. 7C illustrate the light source module 600 at the viewing angle in FIG. 1B.

Referring to FIG. 7A to FIG. 7C, the second portion P2 and the first portion P1 are opposite to each other. Correspondingly, an opening O is formed between the first portion P1 and the light guide plate 112, and the opening O is located on one side of the accommodating space S facing the second portion P2. The first portion P1 is, for example, a strip having a striped opening. A portion of the light guide plate 112 adjacent to the light incident surface SI is disposed in the striped opening of the strip, and the light guide plate 112 is kept in a distance D from the lateral surface of the striped opening to form a space (i.e., the accommodating space S) for accommodating the wavelength conversion material 116 and the opening O for filling the wavelength conversion material 116. In the embodiment, the opening O is disposed on one side of the light output surface SO of the light guide plate 112 adjacent to the light incident surface SI. The above embodiments may serve as reference for the method for forming the wavelength conversion material 116, the method for jointing the first portion P1 and the second portion P2 and the material of the first portion P1 and the second portion P2, and thus no repetitions are incorporated herein.

Figure 8A:
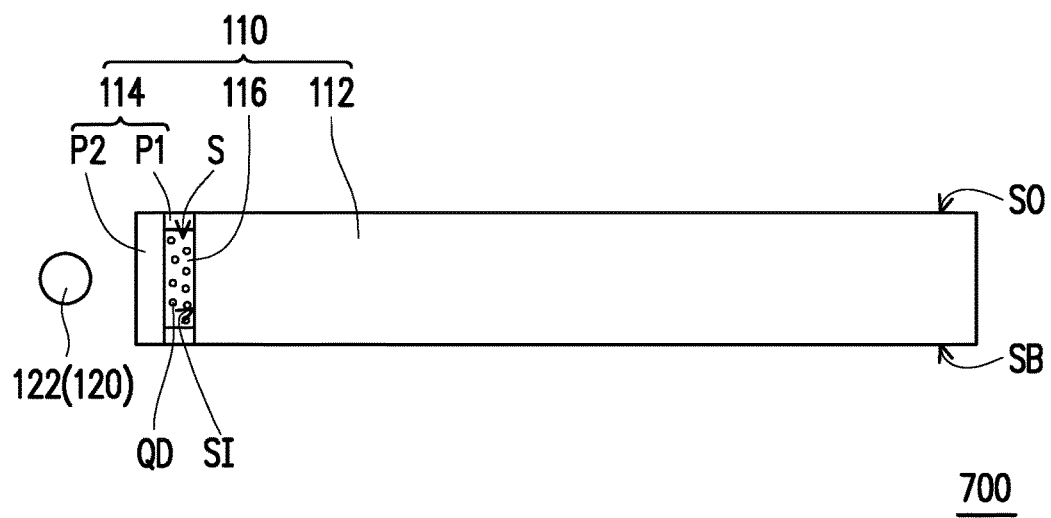
Figure 8B:
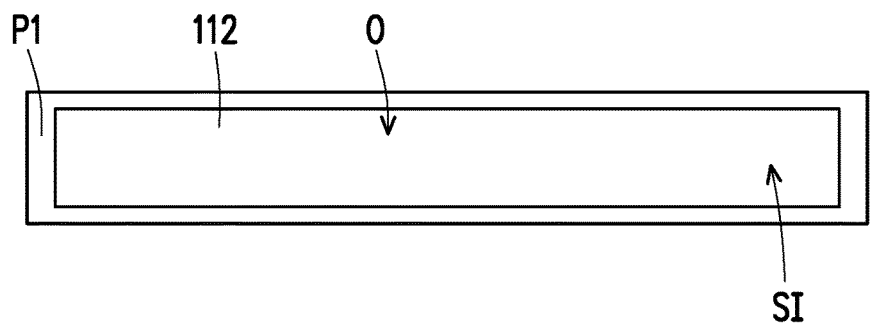

FIG. 8A shows a light source module 700 having the holding element 114 including a first portion P1 and a second portion P2. FIG. 8B does not illustrate the second portion P2 of the holding element 114, the wavelength conversion material 116 and the light source 120 to clearly show the relative configuration relation between the first portion P1 and the light guide plate 112 and the opening O. Additionally, FIG. 8A is a schematic cross-sectional view of the light source module 700, and FIG. 8B is a schematic view of the light source module 700 illustrated at a side viewing angle from the location of the light source 120.

Referring to FIG. 8A and FIG. 8B, the first portion P1 is disposed between the second portion P2 and the light incident surface SI of the light guide plate 112. Specifically, the first portion P1 is, for example, disposed along the edge of the light incident surface SI to enclose a space (i.e., the accommodating space S) for accommodating the wavelength conversion material 116 and the opening O for filling the wavelength conversion material 116. In the embodiment, the opening O faces the light source 120.

After the wavelength conversion material 116 is formed in the accommodating space S, or after the liquid-state or gel-state material for forming the wavelength conversion material 116 is filled in the accommodating space S, the second portion P2 and the first portion P1 may be jointed together to seal the wavelength conversion material 116 in the accommodating space enclosed by the first portion P1, the second portion P2 and the light guide plate 112, thereby preventing the quantum dots QD in the wavelength conversion material 116 from getting moisturized.

The first portion P1 and the second portion P2 may be directly locked, engaged or fixed together through an additional element or a film layer. With such configuration, the material of the first portion P1 and the second portion P2 may include glass or plastic, which should not be construed as a limitation to the invention. Since the second portion P2 is disposed between the wavelength conversion material 116 and the light source 120, the second portion P2 adopts a transparent material to avoid blocking the light beam from the light source 120. On the other hand, since the first portion P1 is not disposed between the wavelength conversion material 116 and the light source 120, that is, the first portion P1 does not block the light beam from the light source 120, the material of the first portion P1 is not limited to the transparent material. In other words, the material of the first portion P1 may be the same as or different from the material of the second portion P2. In an embodiment, the material of the first portion P1 and the second portion P2 may be encapsulant. With such configuration, the encapsulant may be formed (i.e., forming the first portion P1) in a circle on the light incident surface SI of the light guide plate 112, and after the wavelength conversion material 116 is formed within the circle of encapsulant, or after the liquid-state or gel-state material for forming the wavelength conversion material 116 is filled in the circle of encapsulant, another encapsulant is used to seal the wavelength conversion material 116 (i.e., forming the second portion P2). In yet another embodiment, only one of the first portion P1 and the second portion P2 may use the encapsulant as the material.

In summary, according to the embodiment of the wavelength conversion light guide assembly and the light source module of the invention, since the wavelength conversion material is disposed in the closed accommodating space enclosed by the holding element and the light guide plate, the wavelength conversion light guide assembly facilitates to prevent the quantum dots from getting moisturized, and the light source module utilizing the wavelength conversion light guide assembly may have good light-emitting efficiency. Additionally, by configuring the wavelength conversion material on the lateral side of the light guide plate, the amount of the wavelength conversion material can be saved effectively. In an embodiment, the wavelength conversion material may further include a plurality of scattering particles to enhance color conversion efficiency. In yet another embodiment, the wavelength conversion light guide assembly may further include the barrier layer disposed on the surface of the wavelength conversion material to further improve the moisture-proof effect.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A wavelength conversion light guide assembly, comprising:
    a light guide plate,
    a holding element, jointed with at least one side of the light guide plate, wherein the holding element and the light guide plate enclose a closed accommodating space, and a surface of the holding element away from the light guide plate comprises a plurality of micro-structures; and
    a wavelength conversion material, disposed in the accommodating space and comprising a plurality of quantum dots.

2. The wavelength conversion light guide assembly according to claim 1, further comprising:
    an adhesive layer, wherein the holding element and the light guide plate are jointed together through the adhesive layer.

3. The wavelength conversion light guide assembly according to claim 2, wherein a refractive index of the adhesive layer is smaller than or equal to a refractive index of the light guide plate.

4. The wavelength conversion light guide assembly according to claim 1, wherein the wavelength conversion material further comprises a plurality of scattering particles.

5. The wavelength conversion light guide assembly according to claim 1, further comprising:
    a barrier layer, disposed on a surface of the wavelength conversion material.

6. The wavelength conversion light guide assembly according to claim 5, wherein the barrier layer comprises a metal thin film, a silicon-oxide thin film, a silicon-nitride thin film, an aluminum-oxide thin film, or nylon nanocomposites.

7. The wavelength conversion light guide assembly according to claim 1, wherein the holding element comprises:
    a first portion, jointed with the light guide plate, wherein at least one opening is formed between the first portion and the light guide plate, the at least one opening communicates the accommodating space with an external space, the wavelength conversion material is disposed in the accommodating space through the at least one opening; and
    at least one second portion, disposed in the at least one opening to close the at least one opening, wherein the first portion, the at least one second portion and the light guide plate enclose the closed accommodating space.

8. The wavelength conversion light guide assembly according to claim 7, wherein a material of the first portion and the at least one second portion comprises glass, plastic or encapsulant.

9. A light source module, comprising:
    a wavelength conversion light guide assembly, comprising:
        a light guide plate;
        a holding element, jointed with at least one side of the light guide plate, wherein the holding element and the light guide plate enclose a closed accommodating space, and a surface of the holding element away from the light guide plate comprises a plurality of micro-structures; and
        a wavelength conversion material, disposed in the accommodating space and comprising a plurality of quantum dots; and a light source, disposed on a side of the wavelength conversion light guide assembly, wherein the holding element is disposed between the wavelength conversion material and the light source.

10. The light source module according to claim 9, wherein the wavelength conversion light guide assembly further comprises:
an adhesive layer, wherein the holding element and the light guide plate are jointed together through the adhesive layer.

11. The light source module according to claim 10, wherein a refractive index of the adhesive layer is smaller than or equal to a refractive index of the light guide plate.

12. The light source module according to claim 9, wherein the wavelength conversion material further comprises a plurality of scattering particles.

13. The light source module according to claim 9, wherein the wavelength conversion light guide assembly further comprises:
a barrier layer, disposed on a surface of the wavelength conversion material.

14. The light source module according to claim 13, wherein the barrier layer comprises a metal thin film, a silicon-oxide thin film, a silicon-nitride thin film, an aluminum-oxide thin film, or nylon nanocomposites.

15. The light source module according to claim 9, wherein the holding element comprises:
a first portion, jointed with the light guide plate, wherein at least one opening is formed between the first portion and the light guide plate, the at least one opening communicates the accommodating space with an external space, the wavelength conversion material is disposed in the accommodating space through the at least one opening; and
at least one second portion, disposed in the at least one opening to close the at least one opening, wherein the first portion, the at least one second portion and the light guide plate enclose the closed accommodating space.

16. The light source module according to claim 15, wherein a material of the first portion and the at least one second portion comprises glass, plastic or encapsulate.

* * * * *